United States Patent [19]

Shuen

[11] Patent Number: 5,103,475
[45] Date of Patent: Apr. 7, 1992

[54] PROCESSING OF TELECOMMUNICATIONS CALL BILLING DATA

[75] Inventor: Jennifer Y. Shuen, Downers Grove, Ill.

[73] Assignee: AT&T Bell Laboratories, Murray Hill, N.J.

[21] Appl. No.: 605,206

[22] Filed: Oct. 29, 1990

[51] Int. Cl.[5] .................... H04M 15/00; H04M 15/32
[52] U.S. Cl. .................................. 379/115; 379/112; 379/116
[58] Field of Search ............... 379/114, 112, 116, 115, 379/119, 121

[56] References Cited

PUBLICATIONS

T. J. Cieslak et al., "Software Organization and Basic Call Handling", *The Bell System Technical Journal*, No. 4 ESS, vol. 56, No. 7, Sep. 1977, p. 1135.

"Generic Requirements for Flexible Automatic Message Accounting (AMA)", *Technical Advisory TA-T-SY-000413*, Bell Communications Research, Inc., Issue 1, Oct. 1986, pp. 5-1-5-14, Contents page, Table 5.1 page, and FIGS. 5-1 through 5.4.

*Primary Examiner*—Stafford D. Schreyer
*Attorney, Agent, or Firm*—Werner Ulrich

[57] ABSTRACT

This invention relates to a method and apparatus for preparing a billing record for a special service telecommunications call such as a call over a software defined network or a direct service dialing capability call. These calls are characterized by the fact that in order to properly route and bill such calls, remote shared data bases must be consulted to obtain the necessary information, much of which is recorded in the billing record in order to properly charge the customer and to give that customer information about its calls. Special billing information for these special service calls is accumulated in an enhanced billing register capable of storing the special billing information for these special service calls. After timing for two seconds following the receipt of an answer for the call, all the accumulated billing information is transmitted to a separate processor, one of whose functions is the preparation and formatting of billing records. This processor retains the received billing information for the call until a disconnect is received for the call. After the second processor has received the disconnect indication, it prepares a billing record for the call and transfers this billing record either to secondary storage or transmits this information to a remote billing center. Advantageously, by reducing the number of transfers of data between the call control processor and the second processor, a large amount of real time can be saved for the call control processor, thus, substantially increasing the total call handling capacity of the call control processor in a system which handles a large fraction of special service calls.

28 Claims, 3 Drawing Sheets

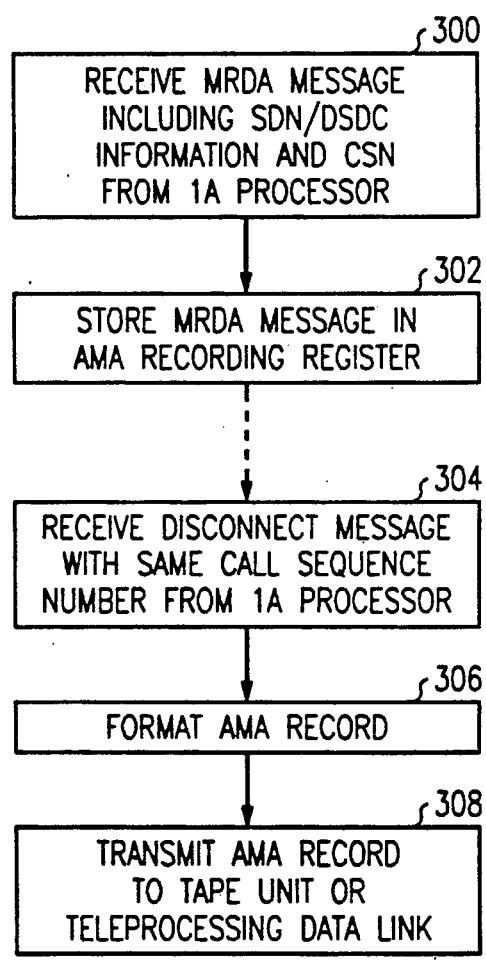

PROCESSING OF TELECOMMUNICATIONS CALL BILLING DATA

TECHNICAL FIELD

This invention relates to a method and apparatus for preparing a billing record for a telecommunications call.

PROBLEM

With enhancements in the capabilities of large toll networks, an increasing fraction of the telephone calls processed by these networks are for software defined network (SDN) calls and Direct Service Dialing Capability (DSDC) calls. It is expected that within five years 50% or more of the total calls handled by some of the larger toll switches will be SDN/DSDC calls. These calls are characterized by the fact that in order to properly route and bill such calls remote shared data bases must be consulted to obtain the necessary information. For example, a software defined network might serve one customer with locations througout the country and with a special internal dialing plan. As information is received in a toll office, the numbers for this special internal dialing plan are translated in a common data base in order to determine the routing for such calls. In order to route the calls, a so-called POTS (for plain old telephone service) number is used for routing the calls according to the North American Numbering Plan. SDN/DSDC calls require a much larger billing record, usually referred to as an Automatic Message Accounting (AMA) record, than do conventional calls. For example, the AMA record would include the caller's number, the billing number of the called customer, the original 800 number dialed by the customer, and a POTS number for accomplishing the final accessing of the called customer. It has been estimated that the average SDN/DSDC call has an AMA record that is approximately one-third longer than the AMA record of a POTS call.

To process a POTS call in a system such as the 4 ESS manufactured by AT&T Network Systems, the AMA record information is accumulated in a main processor, specifically a 1A processor. This information is then passed on to an auxiliary processor, a 3B processor, for formatting prior to recording on tape for final processing at a billing center. In the case of a POTS call, information is passed from the 1A processor to the 3B processor two seconds after a call has been answered and at the time of the disconnect. The reasons for the two second delay is to verify the legitimacy of the answer signal. In the case of an SDN/DSDC call, AMA record information obtained from a shared data base, is transferred to the 3B processor as it is received from the various remote shared data bases that need to be consulted for processing the call, thereby avoiding the necessity for storing this highly variable amount of information in the 1A processor. In some cases, as many as nine separate records are transmitted from the 1A processor to the 3B processor for a single SDN/DSDC call.

In the 1A processor, recording registers for storing all POTS billing information for a call are allocated for each call when the call is received. Information is maintained in these registers until two seconds after a verified answer has been received at which time the appropriate billing information is transmitted to the 3B processor and the register is released. The information for transmitting the final disconnect record is maintained as a reference number for the call in a small block of information associated with the incoming trunk used for the call. Since the size of these registers is small, these registers are designed to store the information. Additional information received from the shared data bases and records for SDN/DSDC calls and required for AMA records is transmitted to the 3B processor as it is received.

Each information transfer action requires a substantial overhead in order to format a message for transmission to the 3B processor. This overhead is also incurred in the 3B processor to unload a buffer in which the message has been received and to interpret the content of the message. As a result, the total amount of real time resources required for processing billing records for SDN/DSDC calls is large and because of the increase in volume of such calls, the total fraction of the real time resources of the 1A and 3B processors devoted to the processing of such billing records will become excessive. As a result, the capacity of switches which handle a large fraction of SDN/DSDC traffic will be substantially decreased below the capacity limitation of their switching networks. A problem of the prior art therefore is that the methods of processing billing records for SDN/DSDC calls consume excessive processor real time and limit the capacity of toll switches that handle a large fraction of such traffic.

SOLUTION

In an exemplary embodiment of the invention, a large recording register adequate for storing the special information required for SDN/DSDC calls is used to store in a call control processor the information required for AMA records for such calls accumulated prior to the time two seconds after verified answer has been received; then a single AMA data transfer is made, for example, to an auxiliary processor for controlling preparation of billing records for recording in secondary storage such as a billing tape or transmission to a billing center or, if a two-part billing record can be processed by an accounting center, by transmitting the AMA data directly to secondary storage or to a billing center. Advantageously, the overhead for additional messages between the main processor and the auxiliary processor is avoided since SDN/DSDC calls only require two AMA data transfers, the same number that is required for handling POTS calls. Advantageously, the decrease in this overhead permits the processing capacity of the system and thereby, the busy hour traffic handling capacity of the system, to be increased. Advantageously, no information is transmitted to the auxiliary processor for calls not completed; this avoids unwinding actions in the auxiliary processor for such calls.

In one specific embodiment of the invention, the extra information required for billing records for SDN/DSDC calls includes data such as a billing number for calls which are not billed to the directory number of the originating customer, a POTS number used for routing the call, the type of call (for example, an 800 call, an intra-software defined network call, etc.). Advantageously, using this arrangement results in a substantial decrease in the amount of real time overhead for transmitting billing messages.

In accordance with one specific embodiment of the invention after the initial billing information has been transmitted to the auxiliary processor, a separate message is transmitted to the auxiliary processor following a disconnect. The disconnect is received, for example, as a common channel signaling message identifying the trunk of the disconnect. This trunk has associated with it a register from which a sequence number identifying the call is obtained. A disconnect indication including both the time of the disconnect and the sequence number is then sent to the auxiliary processor which uses the sequence number to associate the disconnect indication with the rest of the call record. Thereafter, the auxiliary processor formats an AMA record and records this AMA record on tape or transmits this AMA record to a billing center.

A plurality of different data bases may be used to supply the special billing data. An enhanced recording register is provided for storing the additional special billing information. The register is enhanced by either providing larger registers or by providing an annex to a POTS register or by providing pools of POTS registers and of enhanced registers. A direct memory access means is used to transfer information from the call control processor to the auxiliary processor.

Therefore, according to the principles of this invention, special billing information for special calls is stored in a call control processor and transmitted therefrom to secondary storage or to means for controlling recording of billing information after a predetermined interval following the receipt of an answer signal for the call.

BRIEF DESCRIPTION OF THE DRAWING

FIGS. 2 and 3 are flow charts of programs executed by processors of the switching system to implement the invention.

DETAILED DESCRIPTION

Figure 1:
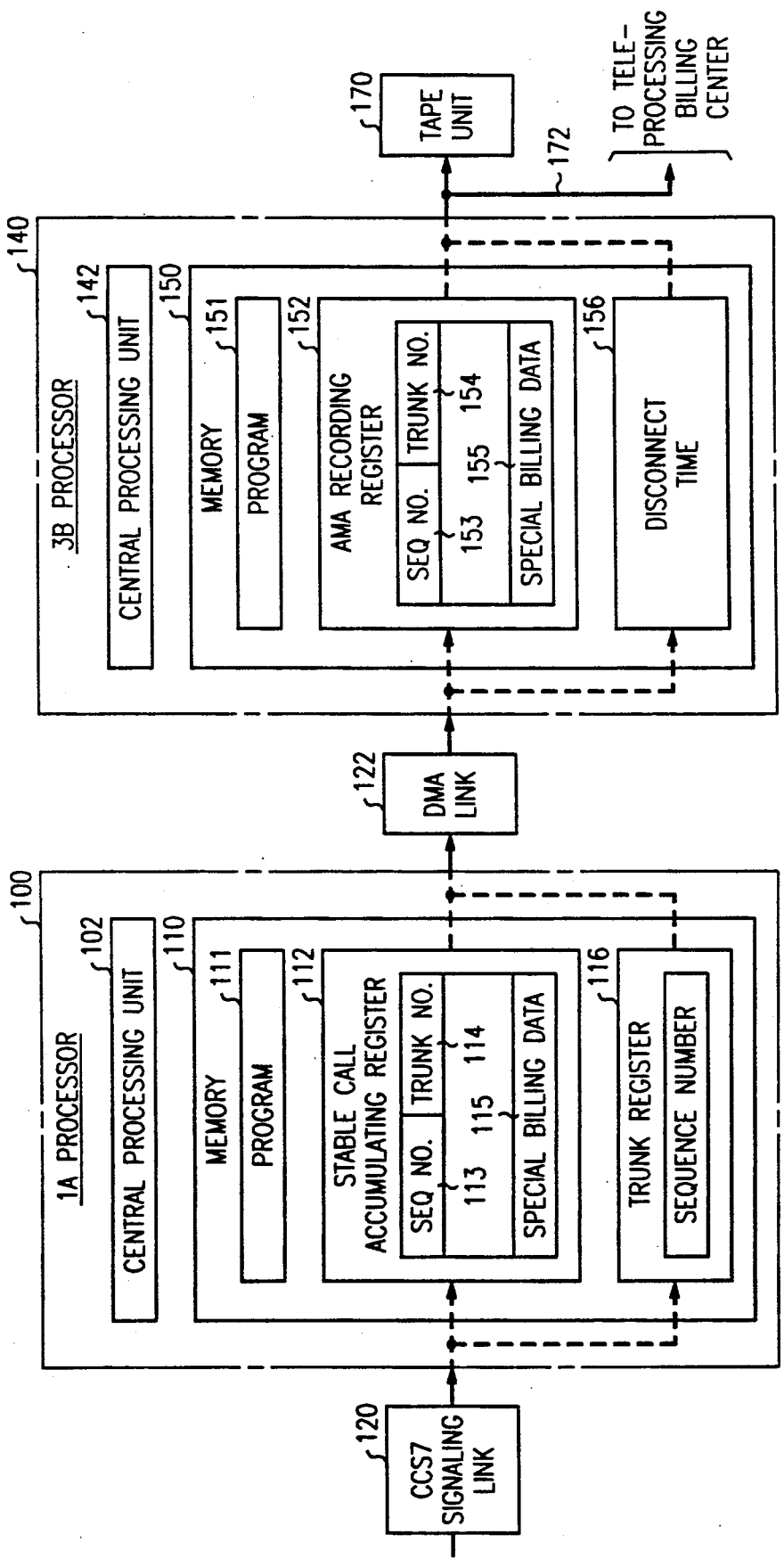
FIG. 1 is a block diagram of a switching system for implementing the invention.

FIG. 1 is a block diagram of one exemplary embodiment of the invention. The embodiment is implemented in the 4 ESS switch manufactured by AT&T Network Systems, and described in *The Bell System Technical Journal (BSTJ)*, September, 1977. The call control processor of that system is a 1A processor 100 described in *BSTJ*, February, 1977. This processor communicates with an auxiliary processor, a 3B processor 140 described in *BSTJ*, January, 1983, Part 2, which is used for formatting AMA data to be recorded on a tape unit 170 or transmitted over a data link 172 to a teleprocessing billing center (not shown).

Information about a call typically comes over a common channel signaling data link such as the CCS7 signaling link 120. The initial information about the call is contained in an initial address message. In response 1A processor 100 controlled by central processing unit 102 under the control of a program 111 stored in memory 110 allocates a stable call accumulation register (SCAR) 112 in the memory for accumulating billing information. A sequence number (SN) 113 is assigned to the call for use in references to the call. If the call is an SDN/DSDC call which requires accessing a data base shared by many toll switches, then that data base is queried over the CCS7 signaling link and data including a special billing data is returned from the data base via the data link 120 and stored in location 115 of SCAR 112. A call is then established and if the called party answers, an answer signal is received over the CCS7 signaling link. Two seconds after that answer has been received, the appropriate data including special billing data 115 is transmitted via a direct memory access (DMA) link 122 to the 3B processor 140. The 3B processor records the Automatic Message Accounting (AMA) data in an AMA recording register (AMARR) 152 within memory 150 of the processor. The 3B processor is controlled by central processing unit 142 acting under the control of program 151 stored in memory 150. AMARR 152 is assigned in the memory 150 and in this register are stored the sequence 153, the trunk number 154 of the incoming trunk used in the call, and the special billing data 155 for that call. This record is retained until the call disconnects.

Special billing data, i.e., data not required for POTS calls comes from a number of data bases under a number of different circumstances, and is encountered especially often in SND/DSDC calls. For example, for an SDN call, it is necessary to record the identity of a revenue accounting office and regional processing center for processing bills for that SDN; to record user sensitive features such as Advanced 800 service calls, Dial-It-Nova calls or multiquest calls; to record resource limit indicators so that the SDN administrators are warned that additional network equipment may be required; to record an indicator that an Integrated Services Digital Network (ISDN) connection is being used; or to record a call progress stopped indicator to specify the reason for terminating a call. DSDC billing records may include an operator handling charge indicator; the identity of the revenue accounting office and regional processing center for processing bills for that DSDC customer; announcement before routing indicators; and service indication codes to specify, for example, the type of 800 call. These billing records may also include a non-dialable (e.g., 0XX-XXXX or 0XX-XXX-XXXX) routing number for the call; an alternate billing number; the actual POTS number of the destination, for example, for an 800 call; waiting (queuing) time in the network; a customer dialed authorization number, etc. The quantity of this special billing data, and the number of occasions within a call that the data is obtained from a data base is likely, if anything, to increase. Even now, using the method of the prior art, it has been estimated that an average SDN/DSDC call requires that special data be obtained an average of approximately six times per call, with a large consequent increase in real time occupancy of the 1A processor for preparing the data for transmission to the 3B processor, and in the 3B processor for receiving such data piecemeal via a plurality of messages. Fortunately, all of this special billing data has one common characteristic: it is obtained prior to the receipt of a verified answer for the call.

When the call disconnects, a disconnect indication is received over the CCS7 signaling link 120. A block of memory associated with the outgoing trunk, block 116, is accessed by the 1A processor to find the sequence number of the call. Data is then sent over DMA link 122 comprising the sequence number for the call and the time of the disconnect. When this is received in 3B processor 140, the sequence number and the incoming trunk number are used to find the AMARR for the call and the disconnect time is then entered in temporary buffer memory location 156 of that memory. Under the control of program 151, the contents of AMARR 152 and location 156 are then formatted for an AMA record and a message containing this formatted data is either sent to an AMA tape unit 170 or is sent over a data link 172 connected to a teleprocessing billing center (not shown).

While in this diagram call information is shown as arriving over common channel signaling facilities, this information can also be received over such signaling facilities as multifrequency signaling wherein the information is sent over a trunk. In either case the information is used for accumulating data in the SCAR 112 and the trunk block 116 for subsequent transmission over the DMA link 122 to 3B processor 140.

Figure 2:
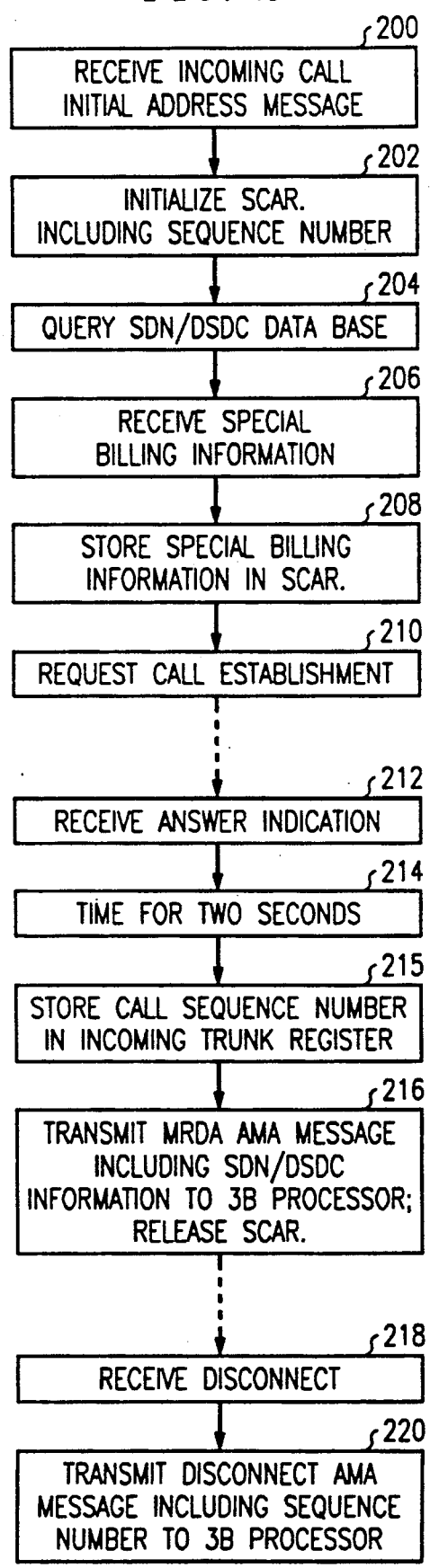

FIG. 2 is a flow diagram of the actions performed in the 1A processor 100. Initially, an incoming call initial address message is received (block 200). Responsive to receipt of that message a SCAR is initialized, the initialization processing including the assignment of a sequence number for the call (action block 202). If the call is a call requiring the use of a shared data base, then a query is sent to the appropriate SDN/DSDC data base (action block 204). The requested information, including special billing information, from the appropriate data base is received (action block 206) and is stored in the SCAR (action block 208). Thereafter, the 1A processor performs actions necessary to request the establishment of the call by finding an appropriate outgoing trunk and sending appropriate CCS messages over the CCS7 signaling link (action block 210). After the called party has been alerted and has answered, the 1A processor receives an answer indication over the CCS7 signaling link (action block 212). After timing for two seconds (action block 214), the sequence number for the call is stored in the trunk register 116 (FIG. 1) for the incoming trunk of the call (action block 215) from which it can be retrieved later (action block 220) at the time of a call disconnect. The 1A processor transmits a minimum recordable duration achieved (MRDA) AMA message including the special billing information to the 3B processor (action block 216). At this time, the SCAR can be released since the information therein has been transmitted to the 3B processor. Alternatively, a disconnect signal can be received over the outgoing or incoming trunk used on the call, with the same resulting actions. Thereafter, the call continues until one of the parties disconnects. A disconnect signal is then received over the CCS7 signaling link by the 1A processor (action block 218) and the 1A processor transmits a disconnect AMA message including the sequence number, found in the trunk block 116 of trunk whose disconnect was received, to the 3B processor (action block 220).

FIG. 3 illustrates the actions performed by the 3B processor. Initially, the 3B processor receives an MRDA message including special billing information and the call sequence number from the 1A processor (action block 300). The 3B processor stores the MRDA message in an AMA recording register seized in response to receipt of the MRDA (action block 302). The information remains there until the 3B processor receives a disconnect message with the same call sequence number from the 1A processor (action block 304). The 3B processor then formats an AMA record (action block 306) and transmits this AMA record (action block 308) to a tape unit, such as tape unit 170 or to a teleprocessing data link 172 for processing by a teleprocessing billing center. This kind of an arrangement can also be used where a call processing processor directly supplies data to a tape or teleprocessing system by using a double entry arrangement, one entry made after the answer timing, a second entry after disconnect. While in the preferred embodiment all the SCAR registers are enhanced to provide space for storing special billing data, other options exist. For example, it is possible to provide two pools of registers; one for POTS calls and one for SDN/DSDC calls, the latter registers being enhanced to provide storage for special billing data. Alternatively, a pool of special billing annexes can be provided and for SDN/DSDC calls an annex can be attached through a pointer to the SCAR for handling that call.

Another advantage of this arrangement is that if a call does not reach the stage of a verified answer as determined by the wait of a predetermined interval such as two seconds following receipt of an answer, then no information has been transferred to the 3B processor and so it is not necessary to clear information from the 3B processor for calls that are not completed. This is especially advantageous during busy periods when a relatively larger fraction of calls is not completed.

The arrangement has a number of advantages over the prior art. By limiting the number of messages to two, both the 3B processor and the 1A processor sharply reduce the amount of message processing overhead. This is an important factor for a system that handles up to 700,000 busy hour calls and is likely to be asked to handle 1,000,000 call per busy hour. Second, if the call remains unanswered, it is not necessary to undo any actions performed in the 3B processor since the 3B processor will receive no AMA input for such calls. Third, by avoiding the necessity for storing full AMA data for the length of a call in the 1A processor, the memory requirements for that processor are substantially reduced over such a solution.

This arrangement has been tested in a system test laboratory and has been found to reduce the real time required for receiving and accumulating billing data in the 3B processor by 45% for an average SDN/DSDC call. This arrangement therefore can substantially defer the time until a 3B processor must be replaced by a faster processor.

It is to be understood that the above description is only of one preferred embodiment of the invention. Numerous other arrangements may be devised by one skilled in the art without departing from the scope of the invention. The invention is thus limited only as defined in the accompanying claims.

I claim:

1. In a telecommunications switching system, a method of recording billing data for a telecommunications call, said billing data comprising special billing data obtained from at least one data base shared by a plurality of switching systems, the method comprising the steps of:
   receiving said special billing data and storing said special billing data in a call control processor means for controlling establishment of calls of said switching system; and
   following the lapse of a predetermined interval after an answer signal has been received for said call, transmitting said stored special billing data to a means for controlling preparation of billing records.

2. The method of claim 1 further comprising:
   in said means for controlling, receiving a disconnect indication for said call; and
   responsive to said receiving a disconnect indication, preparing a billing record for said call.

3. The method of claim 2 further comprising:
   transmitting said billing record to a billing center.

4. The method of claim 2 further comprising:
   recording said billing record in secondary storage.

5. The method of claim 2 wherein said indication comprises a sequence number for identifying said call, and wherein said transmitting comprises transmitting said sequence number; further comprising the steps of:
responsive to receiving said stored special billing data, storing said special billing data and said sequence number in a register of said means for controlling;
wherein said receiving a disconnect indication comprises receiving said disconnect indication from said call control processor means, and storing said disconnect indication in a buffer in memory of said means for controlling; and
wherein said preparing comprises identifying a register containing said sequence number and preparing said billing record using contents of the identified register and said buffer.

6. The method of claim 2 wherein said receiving a disconnect indication comprises receiving a disconnect indication in said call control processor means; transmitting said disconnect indication to said means for controlling; and receiving the transmitted disconnect indication in said means for controlling.

7. The method of claim 6 wherein said step of receiving said disconnect indication in said call control processor means comprises the step of receiving a common channel signaling message comprising said disconnect indication in said call control processor means.

8. The method of claim 1 further comprising the step of:
following said step of transmitting, releasing memory for storing said special billing information in said call processing means; whereby memory for storing said special billing data of said call control processor means is released after answer thus reducing a holding time for said memory for storing.

9. The method of claim 1, wherein a plurality of data bases are used to supply said special billing data, and wherein said receiving and storing comprises receiving and storing a plurality of segments of special billing data, said plurality of segments obtained from a plurality of ones of said data bases.

10. The method of claim 1 wherein said special billing data is stored in a billing register, and wherein said billing register is an enhanced billing register larger than a POTS billing register for a POTS call.

11. The method of claim 10 wherein said enhanced billing register comprises a POTS billing register and an annex.

12. The method of claim 10 wherein essentially all billing registers of said call control processor means are enhanced billing registers.

13. The method of claim 10 wherein said call control processor means comprises POTS billing registers and enhanced billing registers.

14. The method of claim 1 wherein said transmitting comprises transmitting over direct memory access means for transferring data between said call control processor means and said means for controlling preparation of billing records.

15. The method of claim 1 further comprising the step of:
if, prior to reception of an answer signal and a lapse of said predetermined interval, a call record cancellation signal is received, bypassing said step of transmitting said stored special billing data;
whereby no call records are transmitted to said means for controlling if said call is disconnected prior to receipt of a verified answer.

16. In a telecommunications switching system comprising call processor means operative under the control of a program for controlling establishment of calls and control means operative under the control of a program for controlling preparation of billing records, means for recording billing data for a telecommunications call, said billing data comprising special billing data obtained from at least one data base shared by a plurality of switching systems, comprising:
processor means operative under control of a program for controlling reception of said special billing data and storing said special billing data in memory of said call control processor means; and
processor means operative under the control of a program for controlling transmission of said stored special billing data to said control means following the elapse of a predetermined interval after an answer signal has been received for said call.

17. The apparatus of claim 16 wherein said control means comprises:
processor means operative under the control of a program for receiving a disconnect indication for said call; and
processor means operative under the control of a program program responsive to said receiving a disconnect indication for preparing a billing record for said call.

18. The method of claim 17 wherein said control means further comprises:
means for transmitting said billing record to a billing center.

19. The apparatus of claim 17 wherein said control means further comprises:
means for recording said billing record in secondary storage of said control means.

20. The apparatus of claim 16 wherein a plurality of data bases are used to supply special billing data and wherein said means for controlling reception and storing comprise processor means operative under the control of a program for receiving and storing a plurality of segments of special billing data, said plurality obtained from a plurality of ones of said data bases.

21. The apparatus of claim 16 wherein said means for controlling reception and storing stores said special billing data in a billing register, and wherein said billing register is an enhanced billing register larger than a POTS billing register for a POTS call.

22. The apparatus of claim 21 wherein said enhanced billing register comprises a POTS billing register and an annex.

23. The apparatus of claim 21 wherein essentially all billing registers of said call control processor means are enhanced billing register.

24. The apparatus of claim 21 wherein said call control processor means comprises POTS billing registers and enhanced billing registers.

25. The apparatus of claim 16 further comprising direct memory access means for transmitting data between said call control processor means and said control means.

26. In a telecommunications switching system comprising call processor means for controlling establishment of calls and means for controlling preparation of billing records, a method of recording billing data for a telecommunications call, said billing data comprising billing data obtained from a plurality of data bases each data base shared by a plurality of switching systems, the method comprising:

receiving said special billing data and storing said special billing data in said call control processor means;

following elapse of a predetermined interval after an answer signal has been received for said call, transmitting said stored special billing data to said means for controlling preparation of billing records;

following elapse of said predetermined interval, releasing said memory for storing said special billing data;

receiving a disconnect indication for said call in said call control processor means;

transmitting an indication of a disconnect for said call from said call control processor means to said control means;

responsive to receiving said indication of the disconnect in said control means, preparing a billing record for said call;

recording said billing record in secondary storage for said means for controlling;

wherein said special billing data is stored in a billing register of said call control processor means and wherein said billing register is an enhanced billing register larger than a POTS billing register for a POTS call.

27. In a telecommunications switching system, a method of recording billing data for a telecommunications call, said billing data comprising special billing data obtained from at least one data base shared by a plurality of switching systems, the method comprising the steps of:

receiving said special billing data and storing said special billing data in a call control processor means for controlling establishment of calls of said switching system; and following the lapse of a predetermined interval after an answer signal has been received for said call, transmitting said stored special billing data to a means for recording said stored special billing data.

28. In a telecommunications switching system, a method of recording billing data for a telecommunications call, said billing data comprising special billing data obtained from at least one data base shared by a plurality of switching systems, the method comprising the steps of:

receiving said special billing data and storing said special billing data in a call control processor means for controlling establishment of calls of said switching system; and following the lapse of a predetermined interval after an answer signal has been received for said call, transmitting said stored special billing data to a billing center.

* * * * *

UNITED STATES PATENT AND TRADEMARK OFFICE
CERTIFICATE OF CORRECTION

PATENT NO. : 5,103,475
DATED : April 7, 1992
INVENTOR(S) : Jennifer Y. Shuen

It is certified that error appears in the above-identified patent and that said Letters Patent is hereby corrected as shown below:

Column 8, claim 17, line 28, delete second occurrence of "program".
Column 8, claim 23, line 56, delete "register" and substitute -- registers--.

Signed and Sealed this

Thirteenth Day of July, 1993

Attest:

MICHAEL K. KIRK

Attesting Officer        Acting Commissioner of Patents and Trademarks